Jan. 16, 1962 S. R. ROBINSON 3,017,539
ELECTRICAL DISCONNECTOR FOR LIGHTNING ARRESTERS
Filed Sept. 15, 1958 3 Sheets-Sheet 3
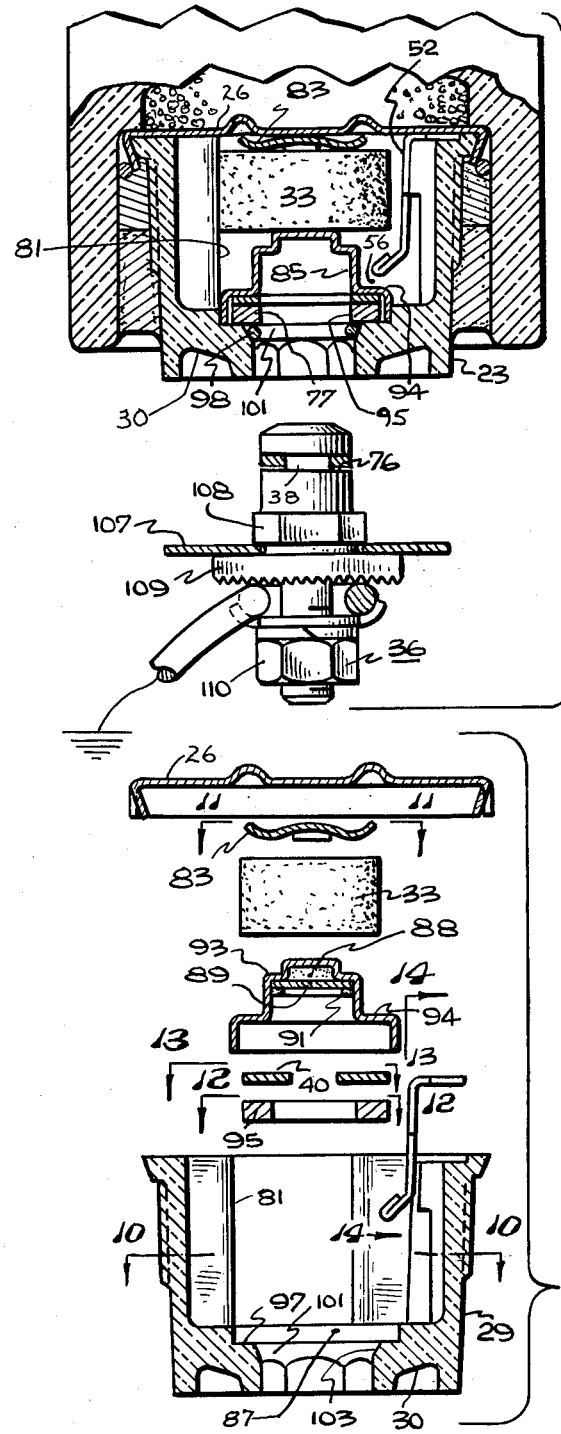
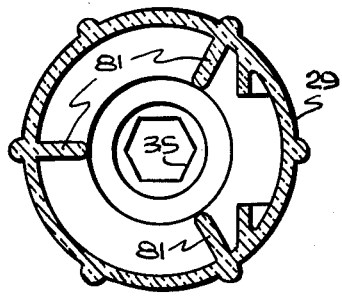
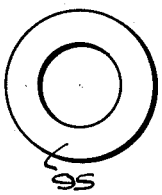
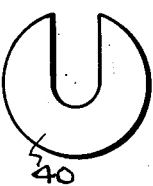
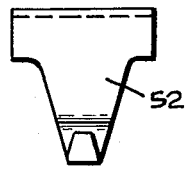
INVENTOR.
SAMUEL R. ROBINSON
BY *Joseph H. Denney*
HIS ATTORNEY

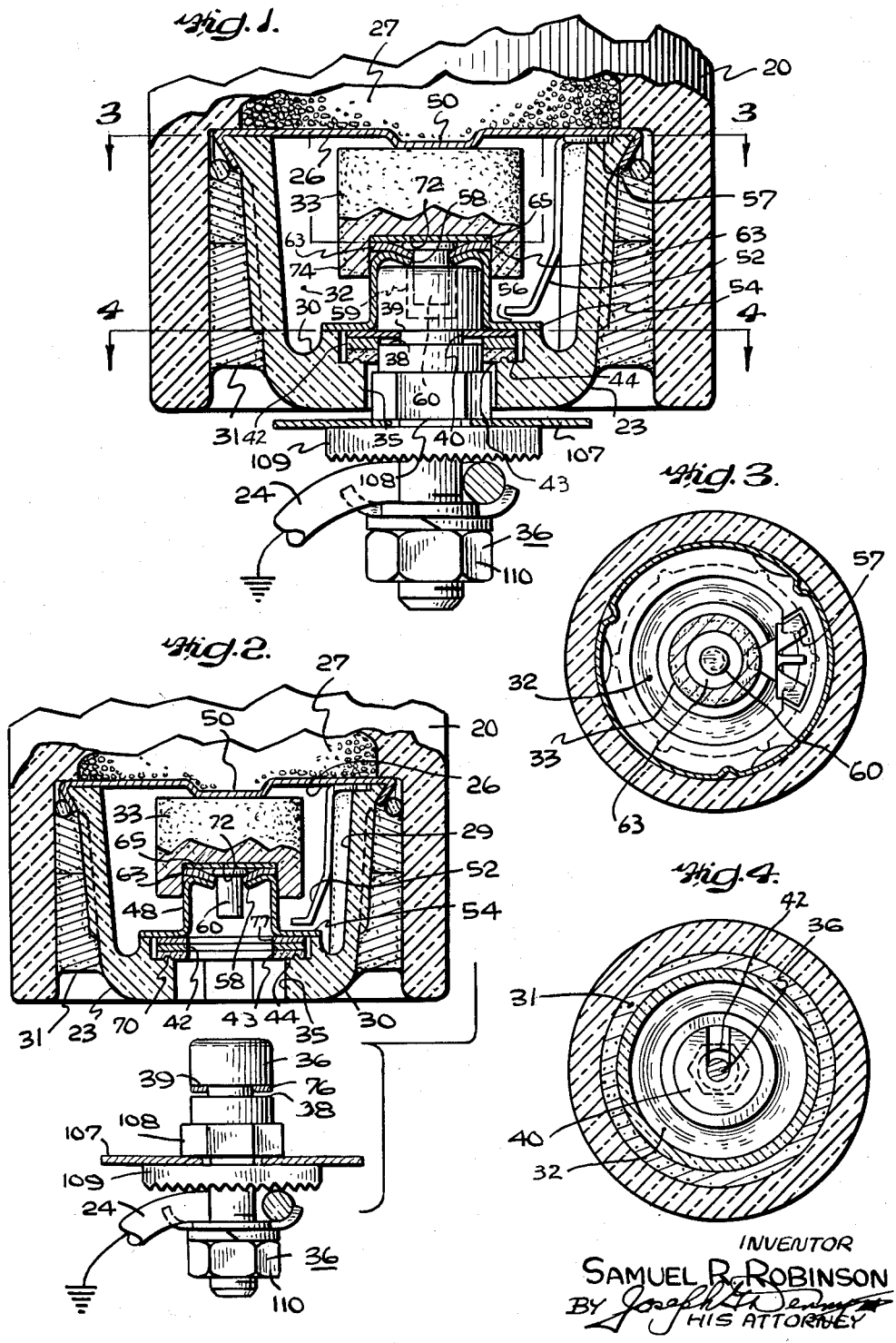

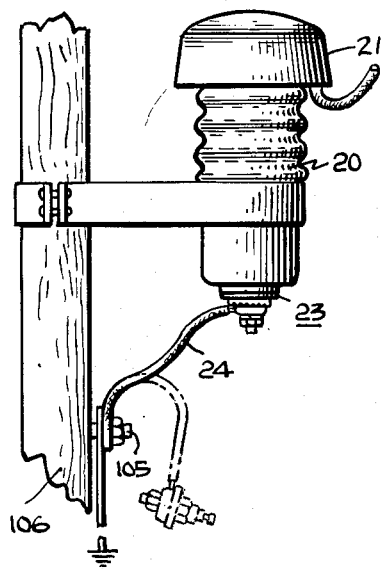
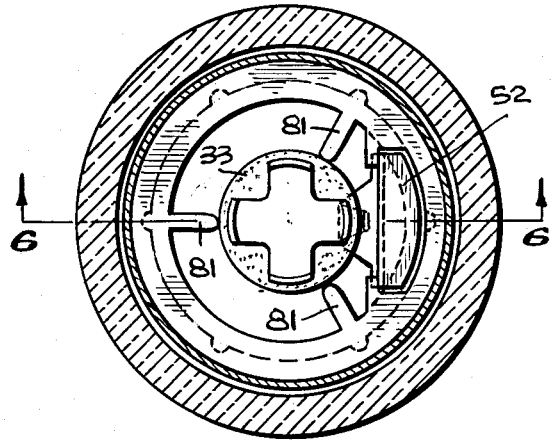
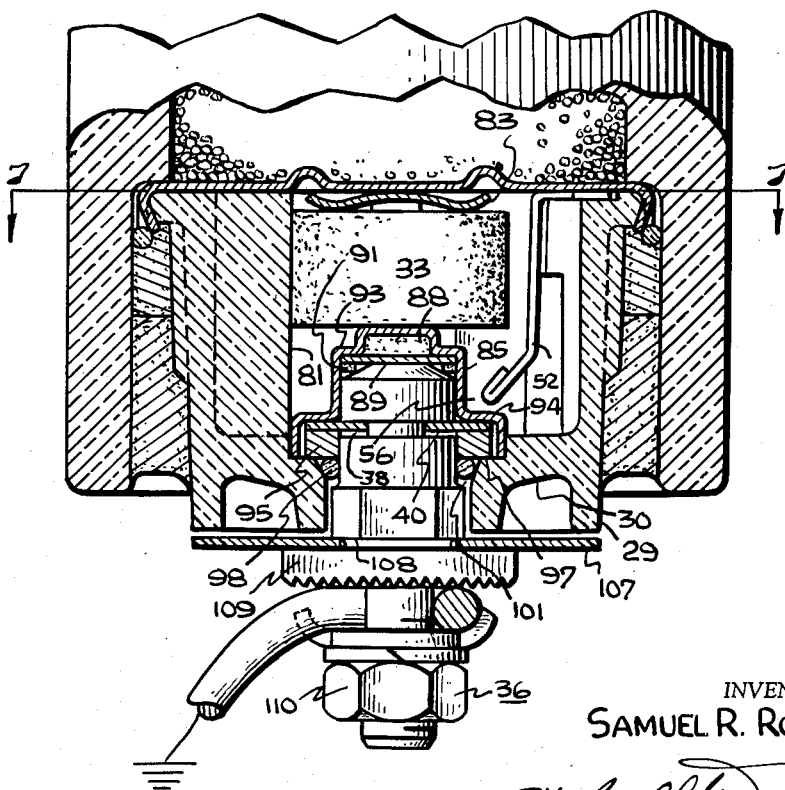

United States Patent Office

3,017,539
Patented Jan. 16, 1962

3,017,539
ELECTRICAL DISCONNECTOR FOR LIGHTNING ARRESTERS
Samuel R. Robinson, Philadelphia, Pa., assignor to H. K. Porter Company, Inc., a corporation of Delaware
Filed Sept. 15, 1958, Ser. No. 760,934
6 Claims. (Cl. 317—66)

My invention relates to an electrical disconnector or separator for a lightning arrester which will remove the lightning arrester from service upon the failure of the arrester.

As is well known, lightning arresters are connected to power lines to carry to ground an electrical current surge, such as that occurring when the power lines are struck by lightning. One type of lightning arrester comprises members defining a plurality of arc gaps in electrical series with a negative resistor or characteristic valve element having an inverse resistance characteristic interposing little resistance to the discharge of high potential surges but offering high resistance to the passage of dynamic current. The arc gaps and the negative resistor are coordinated to permit voltages in the power line in excess of predetermined values to be discharged to the ground and to interrupt the flow of current to the ground when the line voltages have returned to a value below the predetermined value.

Should the lightning arrester fail and thereby continue to electrically connect the power line to the ground after the surge current has ended, a permanent short circuit condition results until the circuit breakers and the fuses protecting the power line operate or until the lines or transformers fail. The circuits connected to such a power line under these conditions will, therefore, be out of service until such time as the failed arrester is located and disconnected therefrom. Various methods have been devised for facilitating the location of a lightning arrester that has failed. One construction provides an explosive charge which is exploded when the lightning arrester is not functioning properly. Such explosion disconnects the lightning arrester and power lines from the ground wire and gives visual evidence, which is readily observable from the ground, as to which arrester has failed. Some of these devices, upon detonation of the explosive, cast off some parts which may injure persons or property in the immediate vicinity of the failed arrester. It is an object of the present invention to provide an improved electrical disconnector which can be explosively disconnected from the lightning arrester with which it is associated upon a failure of the characteristic element of a lightning arrester but which will have a minimum number of parts that can be thrown from the device upon failure of the arrester and subsequent detonation but which will provide adequate visual evidence of the failure.

My disconnector provides two paths for electric current through the disconnector to the ground. One path includes resistance elements in proximity to an explosive charge for heating and igniting the latter when the arrester fails. A second or by-pass path, in parallel with the first, includes an arc gap and is provided for conducting to the ground heavy surge currents without affecting the explosive charge.

The housing for my disconnector supports two electrodes, the first being in electrical contact with an end portion of the lightning arrester and the second being connected to the ground wire. Interposed between the two electrodes is a resistor. The resistor is supported by a cap that encloses a portion of the second electrode and the cap is in electrical contact with both the resistor and the second electrode. The second electrode extends through the housing and is secured thereto by a bridging member that has a portion seated in a groove in the second electrode and another portion supported by the housing. Between the resistor and the second electrode is placed an explosive charge. In addition, one portion of the first electrode forms with the second electrode an arc gap in electrical parallel with the resistor. Thus, the arc gap provides an electrical by-pass around the resistor for shorting out the resistor.

During normal operation, the characteristic valve element and arc gaps of the lightning arrester are effective to limit the flow of dynamic current passing through the lightning arrester and, hence, through the disconnector. When the power line is struck by lightning a surge of electrical current will flow through the lightning arrester and through the electrical disconnector. Since the arc gap of the disconnector presents a larger resistance to the flow of electrical current, initially the surge current will pass through the resistor. As the voltage builds up the arc gap of the disconnector breaks down and the surge current will pass through the arc gap and little or no current will pass at this time through the resistor.

When the surge current passes through the arc gap the dynamic current also passes through the arc gap but as soon as the surge current ends the lightning arrester should stop the flow of dynamic current. However, if there has been a failure of the characteristic valve element of the lightning arrester the dynamic current will continue to flow through the arc gap until it passes through the zero point of the next cycle following the end of the surge current. At this instant it will be easier for the dynamic current to pass through the resistor rather than to restrike the arc across the arc gap. Thus, the flow of dynamic current shifts from the arc gap to the resistor. The resistor and the cap thereupon become heated and the explosive charge is ignited. The ensuing explosion forces the second electrode to shear the bridging member supporting the disconnector in the arrester and the second electrode is propelled outwardly of the housing. Thus, the electrical contact to ground by way of the second electrode and the cap member is broken and the second electrode is free of the arrester but suspended from the utility pole so as to be readily visible.

The foregoing and other objects of my invention, the principles of my invention, and the best forms in which I have contemplated applying such principles will more fully appear from the following description and accompanying drawings in illustration thereof.

In the drawings

FIG. 1 is an axial sectional view of an electrical disconnector constructed in accordance with the present invention and attached to a typical lightning arrester;

FIG. 2 is a sectional view similar to FIG. 1 but showing a portion of the apparatus removed from the housing;

FIG. 3 is a cross-sectional view taken along the line 3—3 of FIG. 1;

FIG. 4 is a cross-sectional view taken along the line 4—4 of FIG. 1;

FIG. 5 is a side elevation illustrating the full lightning arrester and the electrical disconnector incorporating my invention attached to a utility pole;

FIG. 6 is an axial sectional view illustrating a modification of my invention;

FIG. 7 is a cross-sectional view taken along the line 7—7 of FIG. 6;

FIG. 8 is a view similar to FIG. 2 but illustrating the modified embodiment of my invention;

FIG. 9 is an exploded view of a portion of the modified device illustrated in FIG. 6;

FIG. 10 is a cross-sectional view taken along the line 10—10 of FIG. 9;

FIGS. 11, 12 and 13 are plan views taken along the lines 11, 12 and 13 respectively of FIG. 9; and FIG. 14 is a side elevation taken along the line 14—14 of FIG. 9.

Referring to the drawings and in particular to FIGS. 1, 2 and 5, there is illustrated a typical lightning arrester 20 having an upper end 21 (FIG. 5) connected to a power line. The lower portion of the lightning arrester is connected to an electrical disconnector 23, the latter being in turn connected by a conduit 24 to the ground. In normal operation the lightning arrester protects the power line with which it is associated from dangerous surges in electrical current, such as those incident to the power line being struck by lightning, by conducting such surges to the ground through the conduit 24.

The electrical disconnector 23 comprises a first electrode 26 in electrical contact with one end portion of a suitable negative resistor or characteristic valve material 27 contained within the lightning arrester 20. The negative resistance material 27 is of a type well known in the art having an inverse resistance characteristic interposing little resistance to the discharge of high potential surges but offering a relatively high resistance by comparison to the passage of dynamic current.

The electrode 26 is secured to the upper end portion of an insulating housing 29 of cylindrical shape, the latter having a bottom wall 30. The housing 29 is in turn secured by suitable layers of cement 31 to the lower portion of the lightning arrester 20.

The housing 29 defines a chamber 32, as illustrated in FIGS. 1 through 4, in which is disposed a resistor block 33. The resistor block 33 may be composed of silicon carbide grains bonded by sodium silicate or some other ceramic binder. The composition of the resistor block 33 is such that it has less resistance to the flow of surge current than the negative resistance material 27 and has substantially less resistance to the flow of dynamic current than the negative resistance material 27.

Extending through a centrally located opening 35 of and secured to the bottom wall 30 is a disconnectable second electrode 36 to which is connected the conduit 24 by suitable means. The second electrode 36 is provided with an annular groove defined in part by a shoulder 39, the latter supporting the second electrode 36 on the inner peripheral portion of a U-shaped bridging member or washer 40, as best illustrated in FIG. 4. The washer 40 is, in turn, supported by its outer peripheral portion on a washer 42 (FIGS. 1 and 2) of substantial thickness, the latter being positioned on a rigid seal ring 43 placed upon a shoulder 44 adjacent the opening 35.

The upper portion of the second electrode 36 is enclosed by and in intimate contact with a generally cylindrical cap or container 48. The cap 48 is in electrical contact with the second electrode 36 and with the resistor 33. If desired, a suitable centrally located depending portion 50 of the electrode 26 may be utilized to bias the resistor 33 into contact with the top of the cap 48. Thus, the first electrode 26, the resistor 33, the cap 48, the second electrode 36 and the ground wire 24 are in electrical series with each other.

A by-pass electrode 52 is disposed in electrical contact with a right-hand portion, as viewed in FIGS. 1 and 2, of the first electrode 26. The lower portion of the by-pass electrode 52 is spaced from and forms with a portion of a peripheral flange 54 of the cap 48 an arc gap 56 for electrically by-passing or shorting the resistor 33. The upper portion of the by-pass electrode 52 is secured in a recess 57 formed on the top right-hand portion of the housing 29, as best illustrated in FIG. 3, by the first electrode 26.

The cap 48 is provided with a hole 58 aligned with a cylindrical cavity 59 in the upper portion of the second electrode 36 in which is disposed a cartridge 60 containing an explosive and a detonator ignitible upon being exposed to a predetermined temperature for a predetermined length of time. The cartridge 60 is positioned, with respect to the cap 48, by an integral peripheral flange on a washer 63. A disc 65, which may be of copper material, is placed between the cartridge 60 and the resistor 33 to further insure an electrical path between the resistor 33 and the cartridge 60. It is to be noted that the disc 65 makes contact with a large surface area of the resistor 33.

The bridging member 40 is formed from a material, such as aluminum, an alloy of aluminum or some other relatively soft metal, and is of such a thickness and strength that it will rupture or shear when the explosive is ignited. It is necessary that the second electrode be quickly removed from the electrical disconnector 23 prior to the operation of fuses, relays or oil circuit breakers that may be in series with the line affected by the arrester failure so as to prevent an arc from being created which could conceivably extend between the cap 48 and the second electrode 36 after the latter has been expelled from the housing 29 and thereby disrupt the line circuit by causing a burning or tripping of the fuses, relays or oil circuit breakers in series with the line.

As illustrated by FIGS. 1 and 2, the bottom wall 30 is provided with an upstanding peripheral rim 70 engaging and radially positioning the seal 43. The seal 43 abuts a central portion of the second electrode 36 and thereby radially positions the latter. The second electrode is prevented from vertical movement by the bridging member 40. Since the cap 48 tightly engages the upper portion of the second electrode, the cap 48 is restrained from radial movement. In turn, the resistor 33 is formed with a cavity 72 defined partly by marginal depending portions 74 engaging the upper periphery of the cap 48 for radially positioning the resistor 33 within the chamber 32.

In operation, the electrical disconnector is initially in the position illustrated in FIG. 1 and that illustrated by the full lines of FIG. 5. When the power line is struck by lightning the resulting surge current arcs over the usual arrester gaps (not illustrated) and passes through the negative resistance or characteristic valve material 27 to the first electrode 26. The initial current attempts to pass through the resistor 33 and through the cap 48 and second electrode 36 but the voltage quickly builds up, due to the resistance to surge currents of the resistor 33, and when it reaches a predetermined value it arcs across the arc gap 58.

The dynamic current follows the surge current through the arc gap 56 but as soon as the surge current has been taken to the ground the negative resistor 27 prevents the dynamic current from following it. It there has been a failure of the negative resistance 27, so that the dynamic current continues to flow, it will continue to flow through the arc gap 56 until it passes through the zero point of the next cycle following the end of the surge current. At this instant it will be easier for the dynamic current to pass through the resistor 33, the cap 48, and electrode 36, rather than to build up sufficient voltage to restrike the arc across the arc gap 56. In other words, since the resistor 33 presents a resistance of relatively lower value to the dynamic current than that of the gap 56 between electrodes 36 and 52, the flow of dynamic current will be through the resistor 33, the cap 48, and the second electrode 36, rather than through the by-pass electrode 52 and across the arc gap 56. Thus, the flow of current shifts from the arc gap 56 to the resistor 33 within less than one cycle after the termination of the surge current.

In passing through the resistor 33, the cap 48, and the second electrode 36, the cartridge 60 is sufficiently heated to be ignited. Gases at a sufficient pressure are created to force the second electrode downwardly, as illustrated in FIG. 2, causing the bridging member 40 to be sheared between the upper shoulder 39 and the washer 42 into two members, an inner member 76 and an outer member 77. The inner member 76 is expelled with the second electrode (see FIG. 2) and the outer member 77 remains between the flange 54 and the washer 42.

It should be noted that the dynamic current passes through the resistor 33, the cap 48, and the second electrode 36. Each of these members is, to a certain extent, a resistance element and they may be chosen so that they severally or jointly heat up sufficiently to ignite the explosive and detonator within the cartridge 60. As is well known, cartridges may be obtained containing explosives and detonators which will be fairly slow to heat up but will detonate at a low temperature or they can be obtained so that they are fast to heat up but they will detonate at a relatively high temperature. Thus, by coordinating the electrical resistance of the various members with the explosive and detonator the time lag between failure of the negative resistance material 27 and the expelling of the second electrode 36 may be controlled.

A second embodiment of my invention, generally similar to the first, is illustrated by FIGS. 6 to 14 inclusive and similar members have been given the same reference numerals.

In the second embodiment the housing 29 is provided with inwardly extending ribs 81 for radially positioning the resistor 33. Between the resistor 33 and the first electrode 26 is placed a spring 83 for insuring electrical contact therebetween. Between the second electrode 36 and the resistor 33 is disposed a modified cap 85. The lower portion of the cap 85 is received in a recess 87 (formed in the bottom wall 30 of the housing 29) for radially positioning the cap 85.

The upper portion of the cap 85 is spaced from the upper portion of the second electrode 36 so as to form a chamber 88 defined by the top portion of the cap 85 and a washer 89 resting on the top of the second electrode 36, the washer 89 being biased by a seal member 91 and the top part of the second electrode 36 against a shoulder 93 formed on the cap 85.

The by-pass electrode 52 forms with the lower flange portion 94 of the cap 85 an arc gap 56, as in the first embodiment and for the purpose previously described in connection therewith.

The bridging member 40, best illustrated in FIG. 13, is seated on a washer 95 (FIG. 12) that is in turn seated on a shoulder 97 formed on the bottom wall 30. A seal member 98 encompasses the central portion of the second electrode 36 in the annular space 101 formed by the chamfered surface 103, best illustrated in FIG. 9, the bottom of the washer 95, and the second electrode 36.

Within the chamber 88 is placed a suitable explosive including a detonating charge sufficient to expel the second electrode when ignited.

In both embodiments it will be noted that when the second electrode 36 is expelled, FIG. 5 (in dot-dash lines), by shearing the bridging member 40, the inner member 76 thereof is the only part that could possibly become loose and be thrown off when the second electrode 36 is expelled from the housing 29. In the shearing operation, however, the inner member 76 of the bridging member 40 is distorted and will remain within the upper shoulder 39 and lower shoulder 38, even with the succeeding movement that takes place. Movement of the second electrode 36 is, of course, restricted by securing the conduit 24 by suitable means 105 to a utility pole 106, as illustrated in FIG. 5.

Also, in both embodiments, the second electrodes 36 are unitary members and may include nameplates 107 secured between flanges 108 and collars 109 by nuts 110 that also serve to secure the conduits 24 to the second electrodes 36.

Having described my invention, I claim:

1. In an electrical disconnector, an assembly comprising a housing, supporting a first electrode and a second electrode, said second electrode spaced from said first electrode, a shearable bridging member for securing said second electrode to said housing, said second electrode being provided with a groove for receiving a portion of said bridging member, another portion of said bridging member being secured to said housing, a silicon carbide block interposed between said first and second electrodes, said block being in electrical contact with said first and second electrodes, an explosive charge located between said block and said second electrode, and a by-pass member joined to said first electrode for electrically by-passing said block, said by-pass member being spaced from second electrode and forming therewith an arc gap sufficiently removed from said explosive not to ignite said explosive, said explosive charge being ignited upon the passage of a predetermined electric current through said block for a predetermined period of time resulting in the electrical separation of said second electrode from said first electrode.

2. In combination with a lightning arrester for normally containing dynamic current but capable of grounding dynamic and surge electrical currents an automatic ground-interrupting device comprising an insulating housing, spaced first and second electrodes mounted on said housing, said first electrode being connected to said lightning arrester, said second electrode being disconnectible from said housing upon predetermined conditions of current flow through said arrester, said first electrode having a portion forming with a portion of said second electrode an arc gap, a resistor member placed between and in electrical contact with said first and second electrodes, said member providing a path of less resistance than that offered by said arc gap and in parallel therewith to said dynamic electrical current, and an explosive charge positioned between said member and said electrode, said explosive charge being ignited upon a predetermined dynamic electrical current through said member for a predetermined length of time, said second electrode having a washer for mounting said second electrode on said housing, said washer being supported by said housing, said washer being sheared by said second electrode after said explosive is ignited allowing said second electrode to be expelled from said housing.

3. The combination of a lightning arrester having one end portion adapted to be connected to a power line and having a second end portion; an electrical disconnector having a housing, a first electrode connected to said second end portion and a second electrode connected to the ground; said housing having inwardly extending ribs, a cap member having a flange, said second electrode being partially enclosed by said cap member, a resistor in electrical contact with said first electrode and said cap member; said resistor being positioned in said arrester by said first electrode, said cap member and said ribs; and an explosive charge in juxtaposition with said resistor and said second electrode for disconnecting said second electrode from said arrester, portions of said flange and said first electrode defining an arc gap sufficiently removed from said explosive to prevent the ignition of the explosive by the arc.

4. The combination of a lightning arrester having one end portion adapted to be connected to a power line and having a second end portion; an electrical disconnector having a housing, a first electrode connected to said second end portion and a second electrode connected to the ground; a cap member, said second electrode being partially enclosed by said cap member, a resistor in electrical contact with said first electrode and said cap member, walls defining a recess in said resistor, movement of said resistor along one axis being limited by said first electrode and said cap member and along a transverse axis by said walls engaging a portion of said second electrode, and an explosive charge placed between said resistor and second electrode for disconnecting said second electrode from said arrester.

5. The combination of a lightning arrester having one end portion adapted to be connected to a power line and having a second end portion, a separator having a first electrode electrically connected to said second end portion, a resistor in electrical contact with said first electrode, a cap member having a flange, said cap member being in electrical contact and in series with said resistor, a housing supporting said flange and first electrode and enclosing said resistor, a second electrode partially enclosed by said cap member, a bridging member secured between said housing and said flange at its outer periphery, said cap having one portion spaced from said second electrode and forming a space, an explosive charge placed within said space, said second electrode having a shoulder, the inner peripheral portion of said bridging member supporting said shoulder, said second electrode extending through an opening in said housing, and a by-pass member electrically connected to said first electrode for electrically by-passing said resistor, said by-pass member being spaced from said second electrode and forming therewith an arc gap, and said explosive being capable of separating said second electrode from said arrester.

6. In combination with a lightning arrester for grounding surge currents and containment of dynamic currents, an automatic ground-interrupting device comprising an insulating housing, spaced first and second electrodes mounted in said housing, said first electrode being connected to a valve element in said lightning arrester, said second electrode being connected to a grounding wire, the first electrode having a portion forming with a portion of said second electrode an arc gap for the passage and grounding of surge currents, a resistor member in juxtaposition with and in electrical contact with said first and second electrodes, said resistor member providing a path for dynamic electrical currents in parallel with said arc gap, said resistor member being formed from a material having a sufficient resistance to shunt the surge currents through said arc gap and a sufficiently low resistance to dynamic current to conduct said dynamic current between said first and second electrodes, and an explosive charge placed between said resistor member and said second electrode, said explosive charge being ignited upon the passage of predetermined electric current through said resistor member for a predetermined length of time resulting in physical and electrical disconnection of said grounding wire and said second electrode from said arrester and said resistor member.

References Cited in the file of this patent
UNITED STATES PATENTS

| | | |
|---|---|---|
| 2,305,436 | McMorris | Dec. 15, 1942 |
| 2,453,688 | Yonkers | Nov. 9, 1948 |
| 2,504,438 | McFarlin | Apr. 18, 1950 |
| 2,551,858 | Stoelting | May 8, 1951 |
| 2,559,024 | McFarlin | July 3, 1951 |
| 2,777,095 | Stoelting | Jan. 8, 1957 |